United States Patent
Karandikar et al.

(10) Patent No.: US 9,229,733 B2
(45) Date of Patent: *Jan. 5, 2016

(54) SYSTEM AND METHOD FOR PROVIDING AN IMAGE TO AN INFORMATION HANDLING SYSTEM

(71) Applicant: Dell Products L.P., Round Rock, TX (US)

(72) Inventors: Sandeep Karandikar, Austin, TX (US); Aaron Merkin, Round Rock, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/685,350

(22) Filed: Apr. 13, 2015

(65) Prior Publication Data

US 2015/0220351 A1 Aug. 6, 2015

Related U.S. Application Data

(63) Continuation of application No. 13/174,221, filed on Jun. 30, 2011, now Pat. No. 9,032,214.

(51) Int. Cl.
| | |
|---|---|
| *H04L 29/06* | (2006.01) |
| *G06F 15/177* | (2006.01) |
| *G06F 9/44* | (2006.01) |
| *G06F 21/57* | (2013.01) |

(52) U.S. Cl.
CPC .......... *G06F 9/4416* (2013.01); *G06F 21/575* (2013.01); *H04L 63/0876* (2013.01)

(58) Field of Classification Search
None
See application file for complete search history.

(56) References Cited

U.S. PATENT DOCUMENTS

| 7,073,064 | B1 | 7/2006 | Angelo et al. ................ 713/176 |
| 7,174,457 | B1 | 2/2007 | England et al. ................ 713/168 |
| 7,490,245 | B2 | 2/2009 | Waltermann et al. ......... 713/189 |
| 7,571,484 | B2 | 8/2009 | Kraus et al. ..................... 726/26 |
| 7,634,661 | B2 | 12/2009 | England et al. ................ 713/176 |
| 7,788,713 | B2 | 8/2010 | Grobman et al. ............... 725/12 |
| 7,958,367 | B2 | 6/2011 | Uesugi et al. ................. 713/178 |
| 8,560,823 | B1 | 10/2013 | Aytek et al. ..................... 713/2 |
| 8,688,967 | B2 | 4/2014 | Smith et al. ....................... 713/2 |
| 8,898,481 | B1 * | 11/2014 | Osburn et al. ................. 713/192 |

(Continued)

OTHER PUBLICATIONS

Wikipedia; "Wired Equivalent Privacy (WEP)"; www.wikipedia.org; pp. 6, Jun. 6, 2011.

(Continued)

*Primary Examiner* — Christopher Revak
(74) *Attorney, Agent, or Firm* — Baker Botts L.L.P.

(57) ABSTRACT

A system and method for providing an image to an information handling system is disclosed. A method for delivering an image may include booting an information handling system with a provisioning operating system downloaded via a network into a memory of the information handling system. The method may also include calculating, by the second provisioning OS, a fingerprint of an image stored on the information handling system. The method may additionally include determining if the fingerprint matches a previously-calculated fingerprint of the image calculated prior to delivery of the information handling system to its intended destination. The method may further include enabling the information handling system to boot from a storage resource of the information handling system in response to a determination that the fingerprint matches the previously-calculated fingerprint.

20 Claims, 2 Drawing Sheets

(56) References Cited

U.S. PATENT DOCUMENTS

| | | | |
|---|---|---|---|
| 9,032,214 B2* | 5/2015 | Karandikar et al. | 713/179 |
| 2005/0081042 A1 | 4/2005 | Venkatesan et al. | 713/176 |
| 2006/0020810 A1 | 1/2006 | Waltermann et al. | 713/179 |
| 2006/0048228 A1 | 3/2006 | Takemori et al. | 726/22 |
| 2007/0061580 A1 | 3/2007 | Venkatesan et al. | 713/176 |
| 2008/0126779 A1 | 5/2008 | Smith | 713/2 |
| 2008/0155509 A1* | 6/2008 | Ohta et al. | 717/127 |
| 2008/0177994 A1* | 7/2008 | Mayer | 713/2 |
| 2008/0282084 A1 | 11/2008 | Hatakeyama | 713/155 |
| 2008/0288783 A1 | 11/2008 | Jansen et al. | 713/189 |
| 2010/0287455 A1* | 11/2010 | Tripathi et al. | 714/807 |
| 2012/0011502 A1* | 1/2012 | Filali-Adib et al. | 718/1 |

OTHER PUBLICATIONS

Wikipedia; "Wi-Fi Protected Access (WPA)"; www.wikipedia.org; pp. 5, Jun. 6, 2011.
Wikipedia; "IEEE 802.1X"; www.wikipedia.org; pp. 7, Jun. 6, 2011.

* cited by examiner

SYSTEM AND METHOD FOR PROVIDING AN IMAGE TO AN INFORMATION HANDLING SYSTEM

RELATED APPLICATION

This application is a continuation application of U.S. patent application Ser. No. 13/174,221 filed Jun. 30, 2011, now U.S. Pat. No. 9,032,214, which is hereby incorporated by reference.

TECHNICAL FIELD

The present disclosure relates in general to information handling system configuration, and more particularly to a system and method for providing an image for an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

With recent advances in network technology and improved affordability of networking devices, information handling system users and business are increasingly implementing networks and systems (e.g., local areas networks or LANs) that utilize wireless transmissions (e.g., wireless fidelity or "Wi-Fi") and wire-line transmissions in more than one location or in a home without the direct support of an Information Technology (IT) organization. For example, users may implement a home or business network including an information handling system and a wireless access point communicatively coupled to the information handling system. Such a network may allow an information handling system (or a user thereof) to communicate with the one or more network devices via the wireless access point or vice versa.

However, due to the increasing need to supply remote offices, home offices, and sites with a large workforce with information handling systems without the direct support of Information Technology (IT) professionals, an efficient and secure method for configuring the information handling systems is needed. While image installation and setup for experienced users has been greatly simplified with setup wizards and advances in usability features included in operating systems, there is still a need to ensure employees receive the information handling system and network configuration supported by the main office. Certain configurations are often required to ensure secure access to the main office network and to protect proprietary information. In addition, due to the size of the files, downloads of large secure files such as these within a network often restrict the bandwidth available for other users.

Accordingly, a need has arisen for secure systems and methods that allow configuration of factory delivered information handling systems without an on-site Information Technology (IT) professional.

SUMMARY

In accordance with the teachings of the present disclosure, disadvantages and problems associated with providing a secure data image for an information handling system may be substantially reduced or eliminated.

In accordance with embodiments of the present disclosure, a management framework for providing a trusted image to an information handling system may include a provisioning module configured to communicate an image to be installed on an information handling system to a provider of the information handling system and a provisioning operating system (OS) stored on the management framework. The provisioning OS may be configured to boot the information handling system following a download of the provisioning OS to a memory of the information handling system via a network, calculate a fingerprint based on an image stored on the information handling system, determine if the fingerprint matches a previously-calculated fingerprint of the image calculated prior to delivery of the information handling system to its intended destination, and enable the information handling system to boot from the image stored in the information handling system in response to determining that the first fingerprint and the second fingerprint match.

In accordance with other embodiments of the present disclosure, a method for delivering an image may include booting an information handling system with a provisioning operating system downloaded via a network into a memory of the information handling system. The method may also include calculating, by the second provisioning OS, a fingerprint of an image stored on the information handling system. The method may additionally include determining if the fingerprint matches a previously-calculated fingerprint of the image calculated prior to delivery of the information handling system to its intended destination. The method may further include enabling the information handling system to boot from a storage resource of the information handling system in response to a determination that the fingerprint matches the previously-calculated fingerprint.

In accordance with further embodiments of the present disclosure, an information handling system may include a processor, a memory coupled to the processor, and one or more computer-readable media communicatively coupled to the processor. The one or more computer-readable media may have stored thereon an image comprising an operating system and a program of instructions configured to boot the information handling system via a network communicatively coupled to the information handling system and download a provisioning OS via the network into the memory. The provisioning OS may be configured to calculate a fingerprint based on the image; compare the fingerprint to a previously-calculated fingerprint of the image determined prior to delivery of the information handling system to its intended destination; and enable the information handling system to boot from the computer-readable medium in response to determining that the fingerprint matches the previously-calculated fingerprint.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
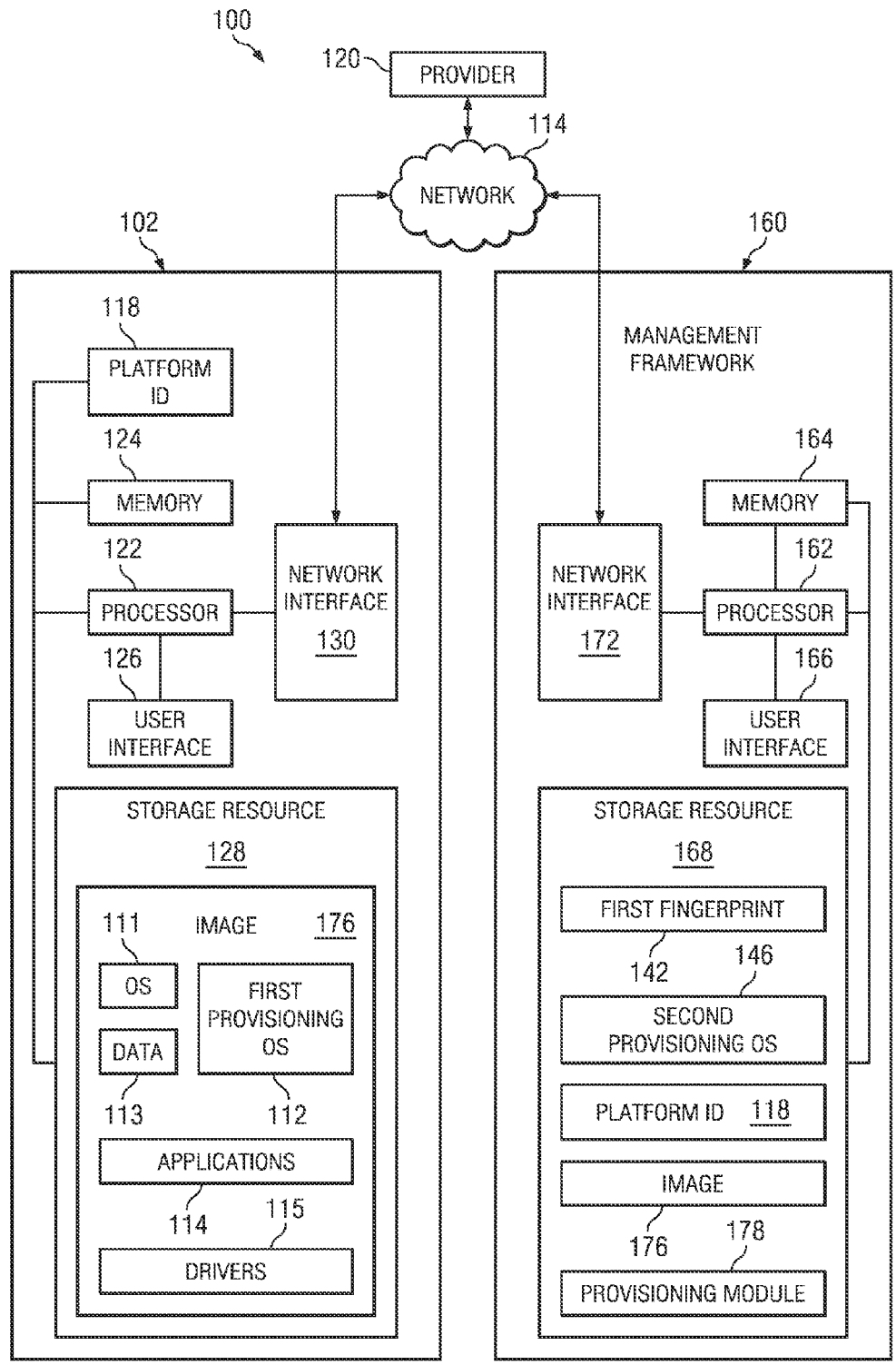
FIG. 1 illustrates a block diagram of a system for providing an image for an information handling system, in accordance with embodiments of the present disclosure.
Figure 2:
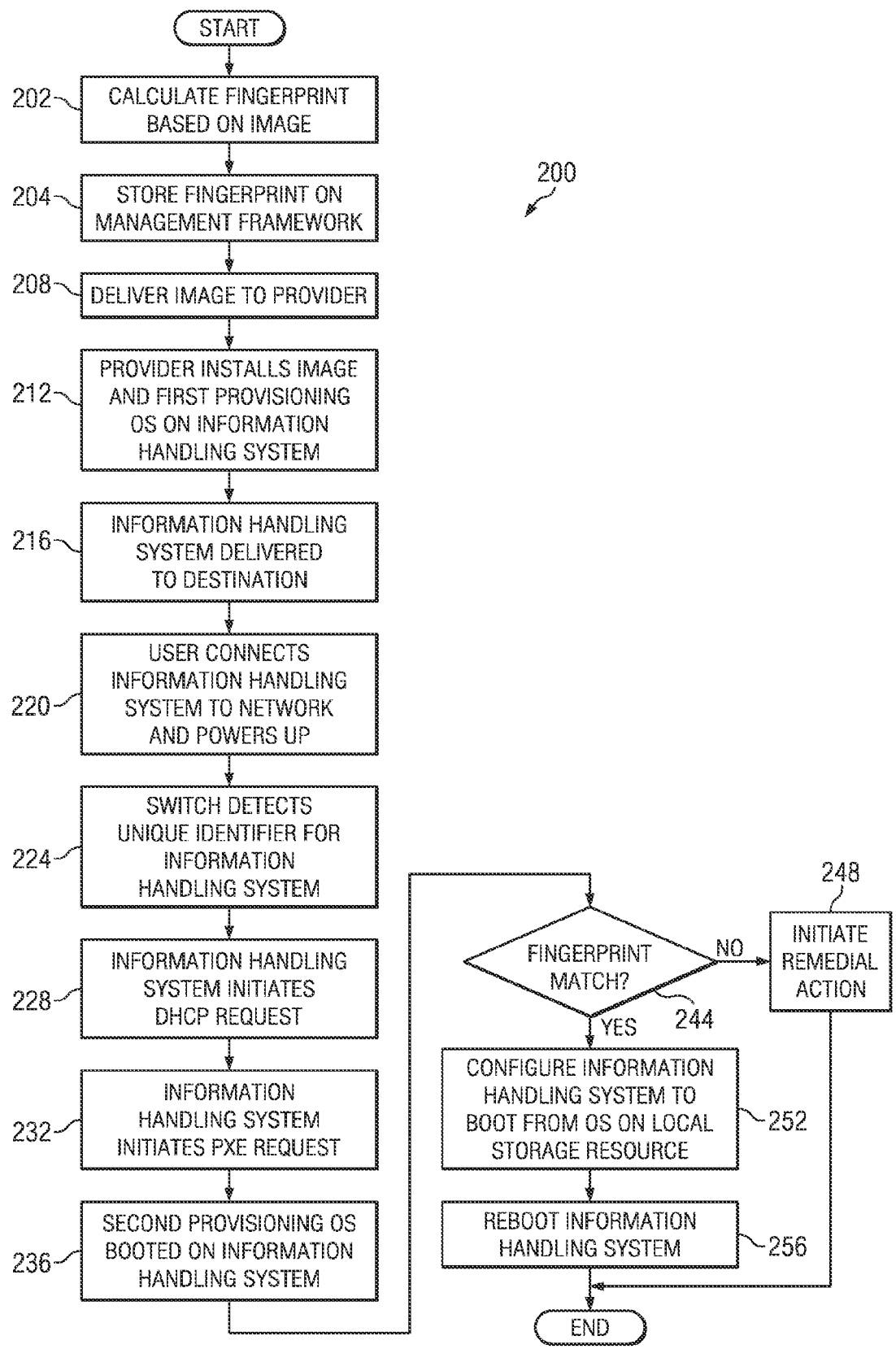
FIG. 2 illustrates a flow chart of a method for providing an image for an information handling system, in accordance with embodiments of the present disclosure.

Preferred embodiments and their advantages are best understood by reference to FIGS. 1-2, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage resource, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

For the purposes of this disclosure, the term "wire-line transmissions" may be used to refer to all types of electromagnetic communications over wires, cables, or other types of conduits. Examples of such conduits include, but are not limited to, metal wires and cables made of copper or aluminum, fiber-optic lines, and cables constructed of other metals or composite materials satisfactory for carrying electromagnetic signals. Wire-line transmissions may be conducted in accordance with teachings of the present disclosure over electrical power lines, electrical power distribution systems, building electrical wiring, conventional telephone lines, Ethernet cabling (10baseT, 100baseT, etc.), coaxial cables, T-1 lines, T-3 lines, ISDN lines, ADSL, and/or any other suitable medium.

For the purposes of this disclosure, the term "wireless transmissions" may be used to refer to all types of electromagnetic communications which do not require a wire, cable, or other types of conduits. Examples of wireless transmissions which may be used include, but are not limited to, personal area networks (PAN) (e.g., BLUETOOTH), local area networks (LAN), wide area networks (WAN), narrowband personal communications services (PCS), broadband PCS, circuit switched cellular, cellular digital packet data (CDPD), radio frequencies, such as the 800 MHz, 900 MHz, 1.9 GHz and 2.4 GHz bands, infra-red and laser.

Examples of wireless transmissions for use in local area networks (LAN) include, but are not limited to, radio frequencies, especially the 900 MHZ and 2.4 GHz bands, for example IEEE 802.11 and BLUETOOTH, as well as infrared, and laser. Examples of wireless transmissions for use in wide area networks (WAN) include, but are not limited to, narrowband personal communications services (nPCS), personal communication services (PCS such as CDMA, TMDA, GSM) circuit switched cellular, and cellular digital packet data (CDPD), etc.

FIG. 1 illustrates a block diagram of an example of a system 100 for providing an image for an information handling system 102, in accordance with embodiments of the present disclosure. As depicted, system 100 may include an information handling system 102, a management framework 160, a network 114, and a provider 120.

Information handling system 102 may generally be operable to receive data from, and/or transmit data to another device via network 114. In one embodiment, information handling system 102 may be a personal computer adapted for home use. In the same or alternative embodiments, information handling system 102 may be a personal computer adapted for business use. As shown in FIG. 1, information handling system 102 may include a processor 122, a memory 124 communicatively coupled to processor 122, a user interface 126, a local storage resource 128, a network interface 130, and a platform identifier (ID) 118.

Processor 122 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 122 may interpret and/or execute program instructions and/or process data stored in memory 124, storage resource 128, and/or another component of information handling system 102.

Platform ID 118 may comprise a unique identifier associated with information handling system 102. The identifier may be a hard drive serial number, a Media Access Control (MAC) address of a network interface card, a service tag and/or other suitable means of uniquely identifying information handling system 102. Although platform ID 118 is depicted as generally residing on information handling system 102, platform ID 118 may reside in storage resource 128, network interface 130, processor 122 or other location in information handling system 102.

Memory 124 may be communicatively coupled to processor 122 and may comprise any system, device, or apparatus operable to retain program instructions or data for a period of time (e.g., computer-readable media). Memory 124 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

User interface 126 may be communicatively coupled to processor 122 and may include any instrumentality or aggregation of instrumentalities by which a user may interact with information handling system 102. For example, user interface 126 may permit a user to input data and/or instructions into information handling system 102 (e.g., via a keyboard, pointing device, and/or other suitable means), and/or otherwise manipulate information handling system 102 and its associated components. User interface 126 may also permit information handling system 102 to communicate data to a user, e.g., by means of a display device.

Local storage resource 128 may be communicatively coupled to processor 122 and/or memory 124 and may include any system, device, or apparatus operable to retain program instructions and/or data for a period of time (e.g., computer-readable media) and that retains data after power to information handling system 102 is turned off. Local storage resource 128 may include one or more hard disk drives, magnetic tape libraries, optical disk drives, magneto-optical disk drives, compact disk drives, compact disk arrays, disk array controllers, and/or any computer-readable medium operable to store data. As depicted in FIG. 1, storage resource 128 may include an image 176. Image 176 may be installed upon information handling system 102 by a provider 120 as described in greater detail below. Image 176 may include an operating system (OS) 111, data 113, applications 114, drivers 115, and/or a first provisioning operating system 112 (e.g., Window Pre-Execution Environment (WinPE)).

Operating system 111 may include programs and data configured to manage information handling system 102 and its components. Examples of operating systems 111 include Windows and Linux. An application 114 may include software executable by processor 122 in conjunction with operating system 111 and configured to perform a specific task. An example of an application 114 may include Microsoft Office and Microsoft Project. Data 113 may include any information stored upon information handling system 102 and accessible to operating system 111, applications 114, and/or drivers 115. For example, data 113 may include user preferences, configurations, and/or user files generated while using applications 114. A driver 115 may include program of instructions configured to configure components of information handling system 102 to communicate with network 114, and/or other components of information handling system 102. First provisioning operating system 112 may include a program of instructions configured to perform a boot process for information handling system 102 (e.g., Windows Pre-Execution Environment (WinPE)).

Network interface 130 may include any suitable system, apparatus, or device operable to serve as an interface between a device, for example, information handling system 102, and network 114. Network interface 130 may enable information handling system 102 to communicate via network 114 using any suitable transmission protocol (e.g., TCP/IP) and/or standard (e.g., IEEE 802.11, Wi-Fi). In certain embodiments, network 114 may include a network interface card (NIC). In the same or alternative embodiments, network interface 130 may be configured to communicate with network 114 via wireless transmissions. In the same or alternative embodiments, network 114 may provide physical access to a networking medium such as a low-level addressing system (e.g., through the use of Media Access Control addresses).

Network 114 may include any suitable network and/or fabric for allowing network communications to/from system 100. Network 114 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 114 may transmit data using any known storage and/or communication protocols. Network 114 and its various components may be implemented using hardware, software, or any combination thereof.

Management framework 160 may include any system, device, or apparatus configured to receive data from, and/or transmit data to another device (e.g., information handling system 102) via network 114. In some embodiments, management framework 160 may comprise one or more information handling systems. In such embodiments, management framework 160 may comprise one or more servers. As shown in FIG. 1, management framework 160 may include a processor 162, a memory 164 communicatively coupled to processor 162, a user interface 166, a local storage resource 168, and a network interface 172.

Processor 162 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 162 may interpret and/or execute program instructions and/or process data stored in memory 164, storage resource 168, and/or another component of management framework 160.

Memory 164 may be communicatively coupled to processor 162 and may comprise any system, device, or apparatus operable to retain program instructions or data for a period of time (e.g., computer-readable media). Memory 164 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to management framework 160 is turned off.

User interface 166 may be communicatively coupled to processor 162 and may include any instrumentality or aggregation of instrumentalities by which a user may interact with management framework 160. For example, user interface 166 may permit a user to input data and/or instructions into management framework 160 (e.g., via a keyboard, pointing device, and/or other suitable means), and/or otherwise manipulate management framework 162 and its associated components. User interface 166 may also permit management framework 160 to communicate data to a user, e.g., by means of a display device.

Local storage resource 168 may be communicatively coupled to processor 162 and/or memory 164 and may include any system, device, or apparatus operable to retain program instructions and/or data for a period of time (e.g., computer-readable media) and that retains data after power to management framework 160 is turned off. Local storage resource 168 may include one or more hard disk drives, magnetic tape libraries, optical disk drives, magneto-optical disk drives, compact disk drives, compact disk arrays, disk array controllers, and/or any computer-readable medium operable to store data. As depicted in FIG. 1, storage resource 168 may include image 176.

Network interface 172 may include any suitable system, apparatus, or device operable to serve as an interface between a device, such as management framework 160, and network 114. Network interface 172 may enable management framework 160 to communicate via network 114 using any suitable transmission protocol (e.g., TCP/IP) and/or standard (e.g., IEEE 802.11, Wi-Fi). In certain embodiments, network 114 may include a network interface card (NIC). In the same or alternative embodiments, network interface 172 may be configured to communicate with network 114 via wireless transmissions. In the same or alternative embodiments, network 114 may provide physical access to a networking medium such as a low-level addressing system (e.g., through the use of Media Access Control addresses).

As depicted in FIG. 1, storage resource 168 may have stored thereon a provisioning module 178, a first fingerprint 142, and image 176 and a second provisioning OS 146. Provisioning module 178 may include any system, device, or apparatus configured to manage and/or facilitate provision of an image to information handling system 102, as set forth in greater detail below. For example, provisioning module 178 may be configured to, based on image 176 to be deployed to information handling system 102, calculate a first fingerprint 142 associated with image 176. First fingerprint 142 may include a hash, cryptographic hash, checksum, and/or other suitable mechanism for creating a unique identifier or signature of image 176. In some embodiments, provisioning module 178 may be implemented as a program of executable instructions. In addition, although depicted as resident on storage resource 168, all or a portion of provisioning module 178 may, in some embodiments, be embodied in hardware or software.

Second provisioning OS 146 may include an operating system configured to, after downloaded from management framework 160 to memory 124 of information handling system 102, boot information handling system 102 and determine whether image 176 on information handling system is equivalent to image 176 communicated to provider 120. To make such determination, second provisioning OS 146 may calculate a second fingerprint associated with image 176 on information handling system 102. The second fingerprint may include a hash, cryptographic hash, checksum, and/or other suitable mechanism for creating a unique identifier or signature of image 176 as present on information handling system 102. Second provisioning OS 146 may further compare first fingerprint 142 to the second fingerprint to determine if they match. If first fingerprint 142 and the second fingerprint match, second provisioning OS 146 may configure information handling system 102 to boot from OS 111 upon its next boot cycle. On the other hand, if first fingerprint 142 and the second fingerprint do not match, remedial action may be initiated. Remedial action may include, without limitation, the provisioning module 178 and/or another module, not explicitly shown, notifying the management framework 160 of the mismatch and the management framework 160 further isolating information handling system 102 from the network 114 and/or communicating notification regarding the error (e.g., a message to an administrator of information handling system 102). Remedial action may also include, for example, second provisioning OS 146 deleting image 176 from the storage resource 128 of information handling system 102.

Provider 120 may include a vendor, seller, manufacturer, wholesaler, factory, and/or other provider of information handling systems, and/or related equipment. Provider 120 may receive image 176 from management framework 160 and install image 176 on information handling system 102 during a build process of information handling system 102, or during a post build process separate from the build process. Build process may include assembling and/or manufacturing information handling system 102.

Although FIG. 1 depicts information handling system 102 as having processor 122, memory 124, user interface 126, network interface 130, and storage 128, any suitable number and/or type of devices may be included in information handling system 102. In addition, although FIG. 1 depicts information handling system 102 communicatively coupled via network 114 to provider 120 and management framework 160, any suitable number of sites or devices may be communicatively coupled to network 114. In addition, although FIG. 1 depicts management framework 160 as having processor 162, memory 164, user interface 166, and storage 168, any suitable number and/or type of devices may be included in management framework 160.

To ensure that provider 120 delivers information handling system 102, including image 176, management framework 160 may communicate image 176 to provider 120. Image 176 may be delivered from the management framework 160 via network 114. Other delivery methods, not explicitly shown, may include a computer readable medium (e.g., a CD) and/or some other suitable device for delivering data for an information handling system 102. Image 176 may include an OS, applications and data mentioned above, or it may be an encrypted version of such OS, applications, and data to further ensure security. To ensure that the image 176 installed on information handling system 102 is the same as that communicated to provider 120 by management framework 160 (e.g., image 176) is not corrupted or malware is not added at the provider 120, management framework 160 may utilize first fingerprint 142 as a mechanism for checking the integrity of image 176. First fingerprint 142 may be stored for later retrieval on the management framework 160. Upon the first initialization of information handling system 102, after delivery from provider 120, first provisioning OS 112 may download second provisioning OS 146 into memory 124 of information handling system 102. Second provisioning OS 146 may calculate a second fingerprint based on image 176 as installed on information handling system 102, and compare the second fingerprint, not explicitly shown, to the first fingerprint 142 to determine the integrity of image 176, as installed on information handling system 102. Although first fingerprint 142 is depicted in the storage resource 168 of management framework 160, first fingerprint 142 may be calculated and/or stored at the provider 120, information handling system 102 and/or other suitable location.

In addition, to further ensure the integrity of the image 176 or to identify a version of image 176, a platform ID 118 as described above and/or a version number may be delivered from the provider 120. As discussed above, the platform ID 118 is a unique identifier of information handling system 102. In addition, a version number of the image 176 installed on information handling system 102 may only be known by provider 120. Provider 120 may deliver platform ID 118 and a version number to its intended destination separately from information handling system 102. This ensures that a third party who intercepts this information handling system or the platform ID 118 and version number may not have complete information to allow access to the image 176 and/or a network 114 associated with information handling system 102.

FIG. 2 illustrates a flow chart of method 200 for providing an image for an information handling system, in accordance with embodiments of the present disclosure. According to one embodiment, method 200 may begin at step 202. As noted above, teachings of the present disclosure may be implemented in a variety of configurations of system 100. As such, the preferred initialization point for the method described and the order of the steps 202-256 comprising method 200 may depend on the implementation chosen.

At step 202, provisioning module 178 may calculate first fingerprint 142 based on image 176. As discussed above, image 176 may include OS 111, a first provisioning OS 112, data 113, applications 114, drivers 115, and/or other suitable information. Also, as discussed above, provisioning module 178 may calculate fingerprint 142 as a hash, checksum or other suitable method. In alternate embodiments, first fingerprint 142 may be calculated by the provider 120 and/or other suitable element of system 100.

At step 204, provisioning module 178 may store first fingerprint 142 on management framework 160. In some embodiments, first fingerprint 142 may be stored in storage resource 168 and/or another suitable component of management framework 160.

At step 208, management framework 160 may communicate image 176 to the provider 120. Image 176 may be communicated via a network 114, a compact disk, and/or other suitable medium. In alternate embodiments, provider 120 may, after receipt of image 176, calculate first fingerprint 142, in lieu of provision module 178, calculating first fingerprint in step 202. In addition, in alternate embodiments, first fingerprint 142 may be calculated and delivered by the provider 120 to management framework 160 or a user and/or administrator of the information handling system for installation upon delivery in the information handling system 102. In alternate embodiments, fingerprint 142 may be delivered to its intended destination via a network 114, compact disk, and/or other suitable means. In addition, in alternate embodiments, first fingerprint 142 may be calculated after a partial deployment of image 176 on information handling system 102. The completion of deployment may be in response to the first fingerprint 142 and the second fingerprint matching at the intended destination.

At step 212, provider 120 may install image 176 on information handling system 102. For example, provider 120 may install image 176 on a computer-readable medium (e.g., storage resource 128) of information handling system 102. This installation may occur during the build process of the information handling system 102. The installation may also occur post-build and may or may not occur in the same geographic location as the build. During installation of image 176, provider 120 may also install first provisioning operating system 112 configured to complete an installation of image 176 after image 176 is determined to be trusted, as explained in greater detail below.

At step 216, provider 120 may deliver information handling system 102 to its intended destination. Provider 120 may deliver directly to the intended destination such that the information technology professional staff responsible for administration of information handling system 102 may not have initial access to it. In an alternate embodiment, provider 120 may also deliver first fingerprint 142 and platform ID 118 associated with information handling system 102 to its intended destination.

At step 220, after delivery of information handling system 102, an individual at the intended destination of information handling system 102 may couple information handling system 102 to network 114 and power on information handling system 102.

In step 224, after power up, a switch or a router (not explicitly shown) within network 114 may detect unique identifier of information handling system 102, for example a Media Access Control (MAC) address.

In step 228, the information handling system 102 may initiate a DHCP request to provisioning module 178. The DHCP request may be used to locate a boot server address identifying a boot server from which information handling system 102 may boot.

At step 232, after a boot server address has been determined, information handling system 102 may initiate a PXE request. The PXE request may be used to contact a PXE boot server within provisioning module 178. Network interface 130 of the information handling system may include hardware or software configured to PXE boot the information handling system at power up. The PXE boot may allow the information handling system 102 to boot using network interface 130 independent of the operating system (OS) 111 and any data storage devices (e.g., storage resource 128 and/or memory 124). The PXE boot may utilize network protocols such as Dynamic Host Configuration Protocol (DHCP) to locate a boot server in management framework 160 and/or Trivial File Transfer Protocol (TFTP) to download an initial boot program and files (e.g., second provisioning OS 146) when powered on.

At step 234, information handling system 102 may download (e.g., via network 114) second provisioning OS 146 via TFTP into local memory (e.g., memory 124) of information handling system 102.

In step 236, second provisioning OS 146 may be executed on information handling system 102.

In step 244, second provisioning OS 146 executing on information handling system 102 may compare the second fingerprint to first fingerprint 142 stored on management framework 160. If first fingerprint 142 and the second fingerprint do not match, method 200 may proceed to step 248. Otherwise, if the first fingerprint 142 and the second fingerprint match, method 200 may proceed to step 252. In alternate embodiments, first fingerprint 142 and/or platform ID 118 may have been provided to a user and/or administrator at the intended destination. After receipt, user and/or administrator may enter first fingerprint 142 and platform ID 118 (e.g., via user interface 126) and second provisioning OS 146 may compare entered information to first fingerprint 142 and/or platform ID 118 as stored on management framework 160.

At step 248, in response to determining that the first fingerprint 142 and the second fingerprint do not match, second provisioning OS 146 may initiate remedial action. Remedial action may include a quarantine procedure that isolates information handling system 102 from network 114 and/or restricts the traffic that may flow between information handling system 102 and network 114. Alternatively or in addition, remedial action may include black-listing the unique identifier (e.g., the MAC address) of information handling system 102 on a switch port located within network 114. Alternatively or in addition, remedial action may include notification to IT staff of the mismatch. Alternatively or in addition, remedial action may include second provisioning OS 146 deleting image 176 from information handling system 102. After completion of step 248, method 200 may end.

At step 252, information handling system 102 may, in response to a determination that first fingerprint 142 and the second fingerprint match, second provisioning OS 146 may configure to boot from OS 111 stored on storage resource 128 of information handling system 102. At step 256, information handling system 102 may reboot. Following such reboot, the information handling system 102 may be ready for use. After completion of step 256, method 200 may end.

Although FIG. 2 discloses a particular number of steps to be taken with respect to method 200, it is understood that method 200 may be executed with greater or lesser steps than those depicted in FIG. 2. In addition, although FIG. 2 discloses a certain order of steps to be taken with respect to method 200, the steps comprising method 200 may be completed in any suitable order. Method 200 may be implemented using system 100 shown in FIG. 1 or any other system operable to implement the method. In addition, as noted above, teachings of the present disclosure may be implemented in a variety of configurations of an information handling system. As such, initialization point for method 200 and the order of the steps 202-256 comprising method 200 described in FIG. 2 may depend on the implementation chosen.

Although the method discussed above contemplates auto-verification of images on an information handling system delivered to a user, methods similar or identical to those set forth herein may be used to auto-verify information handling systems received from an original equipment manufacturer.

Although the present disclosure has been described in detail, it should be understood that various changes, substitutions, and alterations can be made hereto without departing from the spirit and the scope of the invention as defined by the appended claims.

What is claimed is:

1. A non-transitory computer-readable medium comprising instructions for providing a trusted image to information handling systems, the instructions readable by a processor and, when executed, for causing the processor to:
   implement a provisioning module including instructions to:
   communicate a first image to be installed on an information handling system to a provider of the information handling system, the first image represented by a first fingerprint; and
   responsive to a request from the information handling system, download a provisioning operating system stored on the management framework to the information handling system via a network, wherein the provisioning operating system is to:
   boot the information handling system;
   calculate a second fingerprint based on a second image stored on the information handling system;
   determine if the second fingerprint matches the first fingerprint; and
   enable the information handling system to boot from the second image in response to determining that the first fingerprint and the second fingerprint match.

2. The computer-readable medium of claim 1, at least one of the provisioning module and the provisioning operating system further to:
   initiate remedial action in response to determining that the fingerprint does not match the second fingerprint.

3. The computer-readable medium of claim 2, wherein the remedial action includes at least one of: isolating the information handling system from the network, communicating notification that the first fingerprint and the second fingerprint do not match, and deleting the second image from the information handling system.

4. The computer-readable medium of claim 1, wherein each of the first fingerprint and the second fingerprint comprise one of a checksum, a hash, and a cryptographic hash.

5. The computer-readable medium of claim 1, wherein the download of the provisioning operating system to the information handling system occurs during a pre-execution environment (PXE) boot of the information handling system.

6. The computer-readable medium of claim 1, wherein the provisioning operating system is further to reboot the information handling system after enabling the information handling system to boot from the second image.

7. The computer-readable medium of claim 1, wherein the provisioning operating system is further to install an operating system stored within the second image on the information handling system.

8. The computer-readable medium of claim 1, wherein the provisioning module is further to calculate the first fingerprint.

9. The computer-readable medium of claim 1, wherein the first fingerprint is calculated by the provider.

10. A method, comprising:
    booting an information handling system using a provisioning operating system downloaded via a network into a memory of the information handling system, further comprising:
    determining if a first fingerprint of a first image stored on the information handling matches a second fingerprint of a second image, the second fingerprint calculated prior to delivery of the information handling system; and
    enabling the information handling system to boot from a storage resource of the information handling system in response to a determination that the first fingerprint matches the second fingerprint.

11. The method of claim 10, further comprising initiating remedial action in response to determining that the first fingerprint does not match the second fingerprint, wherein the remedial action includes at least one of isolating the information handling system from the network, communicating notification that the first fingerprint and the second fingerprint do not match, and deleting the first image from the information handling system.

12. The method of claim 10, wherein each of the first fingerprint and the second fingerprint comprises at least one of a checksum, a hash, and a cryptographic hash.

13. The method of claim 10, wherein the downloading of the provisioning operating system to the information handling system occurs during a pre-execution environment (PXE) boot of the information handling system.

14. The method of claim 10, further comprising:
    calculating the first fingerprint;
    rebooting the information handling system after enabling the information handling system to boot from the storage resource; and
    installing a target operating system on the information handling system, the target operating system stored within the first image.

15. A non-transitory computer-readable medium comprising instructions, the instructions readable by a processor and, when executed, for causing the processor to:
    boot an information handling system with a provisioning operating system downloaded into the memory via a network communicatively coupled to the information handling system, wherein the provisioning operating system is to:
    calculate a first fingerprint based on a first image comprising a target operating system;
    compare the first fingerprint to a second fingerprint of a second image, the second fingerprint calculated prior to delivery of the information handling system; and
    enable the information handling system to boot from the computer-readable media in response to determining that the first fingerprint matches the second fingerprint.

16. The computer-readable medium of claim 15, wherein the provisioning operating system is further to reboot the information handling system after enabling the information handling system to boot from the computer readable medium.

17. The computer-readable medium of claim 15, wherein the provisioning operating system is further to initiate remedial action when the first fingerprint and the second fingerprint do not match.

18. The computer-readable medium of claim 17, wherein the remedial action comprises at least one of:
- isolating the information handling system from the network;
- communicating notification that the first fingerprint and the second fingerprint do not match; and
- deleting the first image from the information handling system.

19. The computer-readable medium of claim 15, wherein each of the first fingerprint and the second fingerprint comprise at least one of a checksum, a hash, and a cryptographic hash.

20. The computer-readable medium of claim 15, wherein the target operating system is at least partially installed on the information handling system prior to delivery of the information handling system.

* * * * *